US012791459B2

(12) United States Patent
Tatewaki

(10) Patent No.: US 12,791,459 B2
(45) Date of Patent: Nov. 10, 2026

(54) SAMPLE INSERTING DEVICE, SAMPLE INSERTING SYSTEM, PARTICLE SIZE DISTRIBUTION MEASUREMENT SYSTEM, AND SAMPLE INSERTING METHOD

(71) Applicant: HORIBA, Ltd., Kyoto (JP)

(72) Inventor: Yasuhiro Tatewaki, Kyoto (JP)

(73) Assignee: HORIBA, LTD., Kyoto (JP)

( * ) Notice: Subject to any disclaimer, the term of this patent is extended or adjusted under 35 U.S.C. 154(b) by 0 days.

(21) Appl. No.: 19/110,990

(22) PCT Filed: Sep. 8, 2023

(86) PCT No.: PCT/JP2023/032788

§ 371 (c)(1),
(2) Date: Mar. 12, 2025

(87) PCT Pub. No.: WO2024/058063

PCT Pub. Date: Mar. 21, 2024

(65) Prior Publication Data

US 2026/0086012 A1 Mar. 26, 2026

(30) Foreign Application Priority Data

Sep. 14, 2022 (JP) ................................ 2022-145916

(51) Int. Cl.

*G01N 15/0205* (2024.01)
*G01N 15/00* (2024.01)
*G01N 35/10* (2006.01)

(52) U.S. Cl.

CPC ..... *G01N 15/0211* (2013.01); *G01N 35/1011* (2013.01); *G01N 35/1016* (2013.01);
(Continued)

(58) Field of Classification Search

CPC ........... G01N 15/0211; G01N 35/1011; G01N 35/1016; G01N 2015/0019;
(Continued)

(56) References Cited

U.S. PATENT DOCUMENTS

2006/0052944 A1 3/2006 Nagura
2007/0046937 A1 * 3/2007 Togawa ............ G01N 15/0205 356/336

(Continued)

FOREIGN PATENT DOCUMENTS

JP 2006-505803 A 2/2006
JP 2006-071329 A 3/2006

(Continued)

OTHER PUBLICATIONS

International Search Report mailed on Oct. 10, 2023, issued for the corresponding International patent application No. PCT/JP2023/032788, with English translation, 5 pages.

(Continued)

*Primary Examiner* — Md M Rahman

(74) *Attorney, Agent, or Firm* — LUCAS & MERCANTI, LLP

(57) ABSTRACT

An embodiment of the present invention reliably inserts a powder sample into a sample introduction unit of a particle size distribution measurement device while automating the insertion of the powder sample, and includes: a movement mechanism that moves a holding tube capable of holding a powder sample in a tip opening portion between a collection position at which the tip opening portion is inserted into the powder sample in a sample container to collect the powder sample and an insertion position at which the powder sample is inserted into a sample introduction unit; and an extrusion mechanism that extrudes the powder sample held in the tip opening portion to outside from the tip opening portion in a state where the holding tube is at the insertion position.

13 Claims, 8 Drawing Sheets

(52) U.S. Cl.
CPC ................ *G01N 2015/0019* (2013.01); *G01N 2035/1025* (2013.01); *G01N 2035/1058* (2013.01)

(58) Field of Classification Search
CPC ... G01N 2035/1025; G01N 2035/1058; G01N 2015/0096
USPC .......................................................... 356/335
See application file for complete search history.

(56) References Cited

U.S. PATENT DOCUMENTS

| | | | |
|---|---|---|---|
| 2008/0182340 | A1 | 7/2008 | Lemmo |
| 2019/0120729 | A1 | 4/2019 | Obunai |

FOREIGN PATENT DOCUMENTS

| | | | |
|---|---|---|---|
| JP | 4830841 | B | 12/2011 |
| JP | 2016-218048 | A | 12/2016 |
| JP | 6560285 | B | 8/2019 |
| WO | 2004/041435 | A2 | 5/2004 |
| WO | 2017/175821 | A1 | 10/2017 |

OTHER PUBLICATIONS

European Extended Search Report, dated Aug. 5, 2026, which was issued for the corresponding European patent application No. 23865418.0, 15 pages.

* cited by examiner

SAMPLE INSERTING DEVICE, SAMPLE INSERTING SYSTEM, PARTICLE SIZE DISTRIBUTION MEASUREMENT SYSTEM, AND SAMPLE INSERTING METHOD

CROSS REFERENCE TO RELATED APPLICATION

This Application is a 371 of PCT/JP2023/032788 filed on Sep. 8, 2023, which, in turn, claims priority of Japanese Patent Application No. 2022-145916 filed on Sep. 14, 2022, and the above applications are incorporated herein by reference.

TECHNICAL FIELD

The present invention relates to a sample inserting device used in a particle size distribution measurement device, a sample inserting system using the sample inserting device, a particle size distribution measurement system using the sample inserting device, and a sample inserting method into the particle size distribution measurement device.

BACKGROUND ART

Conventionally, in a case where a particle size distribution of a powder sample is measured by a laser diffraction/scattering type particle size distribution measurement device such as Patent Literature 1, the powder sample is inserted little by little into a sample introduction unit of the particle size distribution measurement device, and after a desired amount of the powder sample is inserted, the particle size distribution is measured. Specifically, a user uses a dispensing spoon to insert the powder sample in the sample introduction unit little by little, monitors the transmitted light intensity (transmittance) corresponding to the inserted powder sample, and starts the particle size distribution measurement when the transmitted light intensity (transmittance) falls within an appropriate range.

CITATION LIST

Patent Literature

Patent Literature 1: JP 2006-71329 A

SUMMARY OF INVENTION

Technical Problem

Incidentally, in the case of automatically inserting a powder sample into a sample introduction unit of a particle size distribution measurement device, it is conceivable to insert the powder sample little by little into the sample introduction unit by causing a robot to operate a dispensing spoon.

However, in the case of using a robot, it is difficult to reliably perform the operation of scooping the powder sample with the dispensing spoon and inserting the powder sample into the sample introduction unit, and in particular, it is difficult to collect the powder sample using the dispensing spoon.

Therefore, the present invention has been made to solve the above-described problem, and it is a main object of the present invention to reliably insert a powder sample into a sample introduction unit of a particle size distribution measurement device while automating the insertion of the powder sample.

Solution to Problem

That is, a sample inserting device according to the present invention is a sample inserting device that collects a powder sample from a sample container storing the powder sample and inserts the collected powder sample into a sample introduction unit of a particle size distribution measurement device, the sample inserting device includes: a movement mechanism that moves a holding tube capable of holding the powder sample in a tip opening portion between a collection position at which the tip opening portion is inserted into the powder sample in the sample container to collect the powder sample and an insertion position at which the powder sample is inserted into the sample introduction unit; and an extrusion mechanism that extrudes the powder sample held in the tip opening portion to outside from the tip opening portion in a state where the holding tube is at the insertion position.

According to such a sample inserting device, since the holding tube capable of holding the powder sample in a tip opening portion is moved between the collection position and the insertion position by the movement mechanism, the powder sample can be automatically inserted from the sample container into the sample introduction unit. Here, at the collecting position, the tip opening portion of the holding tube is inserted into the powder sample in the storage portion, and the powder sample enters inside the tip opening portion, whereby the powder sample is held in the tip opening portion. That is, even in a case when it is necessary to collect a small amount (for example, 1 to 10 mg) of powder sample, it is possible to reliably collect the powder sample only by inserting the tip opening portion of the holding tube into the sample. In addition, since the powder sample held in the tip opening portion of the holding tube at the inserting position is extruded to the outside from the tip opening portion by the extrusion mechanism, the powder sample held in the tip opening of the holding tube can be reliably inserted into the sample introduction unit.

It is desirable that the sample inserting device of the present invention further includes a transmitted light information reception unit that receives, from the particle size distribution measurement device, transmitted light information related to transmitted light of the sample liquid containing the powder sample inserted into the sample introduction unit, and the sample inserting device repeats a collection operation and an insertion operation of the powder sample until the transmitted light information received by the transmitted light information reception unit satisfies a predetermined condition.

With this configuration, by using the transmitted light information obtained by the particle size distribution measurement device, the amount of the powder sample to be inserted into the sample introduction unit can be automatically adjusted to an amount suitable for measurement, and the particle size distribution of the powder sample can be accurately measured.

As a specific embodiment of the extrusion mechanism, it is desirable that the extrusion mechanism extrudes the powder sample held in the tip opening portion to outside from the tip opening portion by supplying gas to the holding tube and discharging gas from the tip opening portion.

By adopting a configuration in which the gas is supplied to the holding tube to extrude the powder sample from the tip opening portion in this manner, the extrusion mechanism can be simplified, and the powder sample in the tip opening portion can be inserted into the sample introduction unit almost without remaining.

When the holding tube is inserted at the same position in the sample container, the powder sample is lost and dented only at the portion, and there is a risk that collection failure of the powder sample by the holding tube occurs. In order to suitably solve this problem, it is desirable that the movement mechanism is able to change the collection position in the sample container.

With this configuration, by changing the collection position in the sample container, the holding tube can be reliably inserted into the powder sample, and the powder sample can be reliably collected. Note that changing the collection position in the sample container includes, for example, changing a position in a horizontal plane in the sample container or changing a vertical position in the sample container.

In addition, it is desirable that the movement mechanism stirs the powder sample in the sample container with the holding tube.

With this configuration, since the powder sample in the sample container can be leveled, the holding tube can be reliably inserted into the powder sample, and the powder sample can be reliably collected.

It is desirable that the sample inserting device according to the present invention further includes a vibration unit that vibrates the sample container.

With this configuration, since the powder sample in the sample container can be leveled, the holding tube can be reliably inserted into the powder sample, and the powder sample can be reliably collected.

It is desirable that the movement mechanism moves the holding tube between the collection position and the insertion position by moving the holding body to which the holding tube is detachably attached.

With this configuration, the holding tube can be replaced with a holding tube corresponding to the type (for example, a powder sample having a coarse particle size, a powder sample having a fine particle size, a powder sample having high fluidity, a powder sample having low fluidity, or the like) of the powder sample.

In order to automatically replace with the holding tube corresponding to the type of powder sample, it is desirable that the sample inserting device according to the present invention includes a holding tube installation portion that installs a plurality of types of holding tubes corresponding to respective types of powder sample, and the movement mechanism moves the holding body to the holding tube installation portion to attach the holding tube corresponding to the type of the powder sample to the holding body.

Note that it is conceivable that the sample inserting device selects the holding tube corresponding to the powder sample stored in the sample container on the basis of, for example, identifier information obtained by reading an identifier (for example, an IC chip, a bar code, a QR code (registered trademark), or the like) provided in the sample container.

Water serving as a solvent for the powder sample is stored in the sample introduction unit of the particle size distribution measurement device. If the holding tube is too high with respect to the sample introduction unit, the powder sample inserted from the holding tube spreads and scatters around the sample introduction unit. On the other hand, if the holding tube is too low with respect to the sample introduction unit, the holding tube comes into contact with water, and the powder sample in the sample container cannot be appropriately collected from the next time.

In order to solve these problems and adjust the holding tube to an appropriate position with respect to the sample introduction unit, it is desirable that the sample inserting device according to the present invention further includes a water level information reception unit that receives water level information of water serving as a solvent for the powder sample in the sample introduction unit, and the movement mechanism adjusts the insertion position on the basis of the water level information.

In addition, a sample inserting system according to the present invention includes the sample inserting device described above, and a housing that accommodates at least a part of the particle size distribution measurement device including the sample inserting device and the sample introduction unit.

In this sample inserting system, since at least the sample introduction unit of the sample inserting device and the particle size distribution measurement device is accommodated in the housing, the housing functions as a protective fence to enhance safety, and the powder sample can be prevented from scattering around.

Furthermore, the particle size distribution measurement system according to the present invention includes the particle size distribution measurement device and the sample inserting device described above.

In addition, a sample inserting method according to the present invention is a sample inserting method of collecting a powder sample from a sample container storing the powder sample and inserting the collected powder sample into a sample introduction unit of a particle size distribution measurement device, the sample inserting method including: a collection step of inserting the tip opening portion into the powder sample in the sample container to collect the powder sample using a holding tube capable of holding the powder sample in the tip opening portion; and an insertion step of moving the holding tube holding the powder sample to the sample introduction unit and inserting the powder sample held by the holding tube into the sample introduction unit.

In addition, it is desirable that the sample inserting method according to the present invention includes: acquiring transmitted light information related to transmitted light of sample liquid containing the powder sample inserted into the sample introduction unit from the particle size distribution measurement device; and repeating the collection step and the insertion step until the transmitted light information satisfies a predetermined condition.

Advantageous Effects of Invention

According to the present invention configured as described above, it is possible to reliably insert the powder sample into the sample introduction unit of the particle size distribution measurement device while automating the insertion of the powder sample.

DESCRIPTION OF EMBODIMENTS

Hereinafter, an embodiment of a particle size distribution measurement system using a sample inserting device according to the present invention will be described with reference to the drawings.

Note that any of the drawings described below is schematically illustrated by being omitted or exaggerated as appropriate for easy understanding. The same components are denoted by the same reference signs, and the description thereof will be omitted as appropriate.

Figure 1:
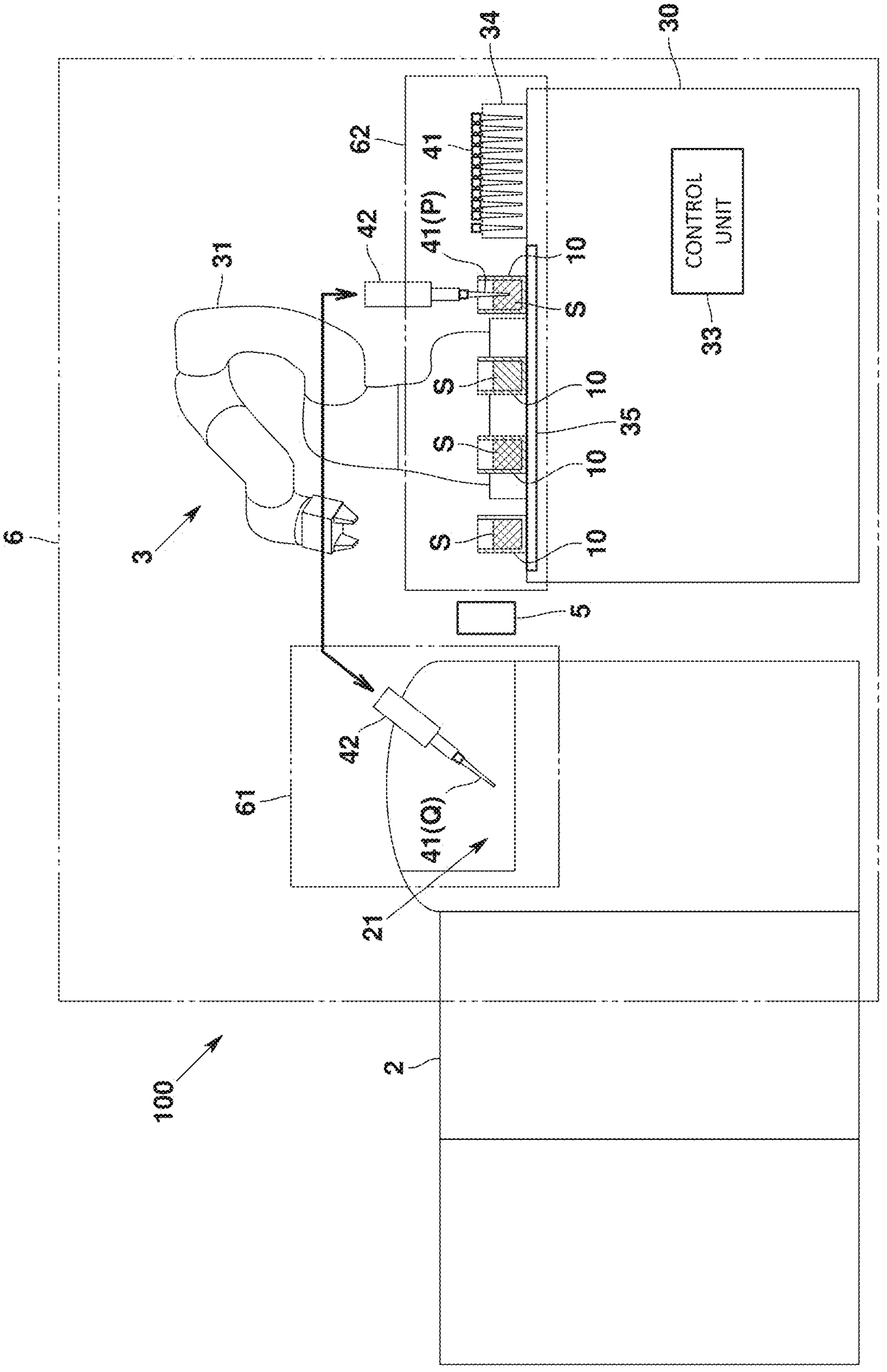
FIG. 1 is a schematic diagram illustrating a particle size distribution measurement system according to an embodiment of the present invention.

As illustrated in FIG. 1, a particle size distribution measurement system 100 according to the present embodiment includes a laser diffraction/scattering type particle size distribution measurement device 2 and a sample inserting device 3 that automatically inserts a powder sample S into the particle size distribution measurement device 2.

Particle Size Distribution Measurement Device 2

Figure 2:
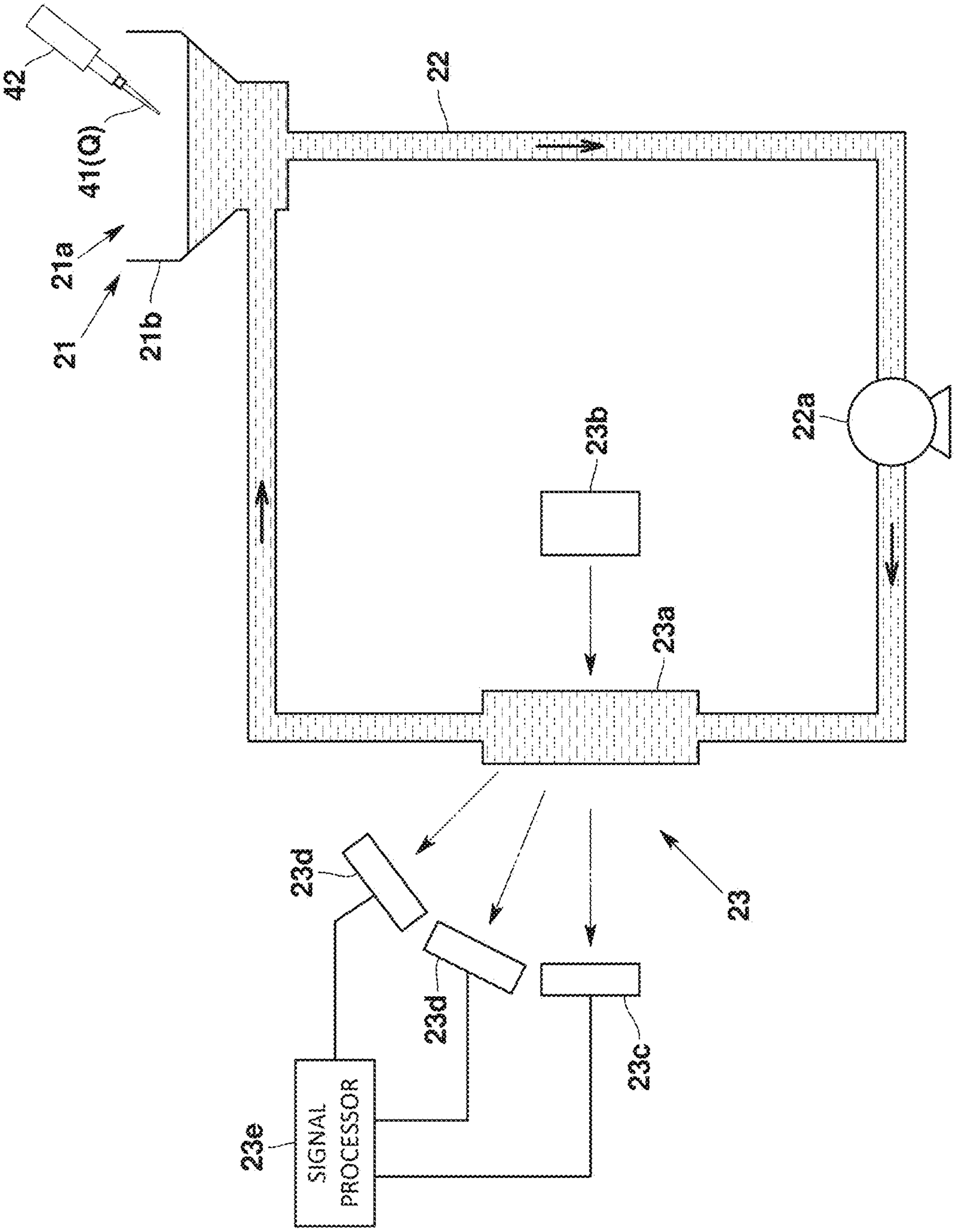
FIG. 2 is a diagram schematically illustrating a configuration of a particle size distribution measurement device according to the embodiment.

As illustrated in FIG. 2, the particle size distribution measurement device 2 includes a sample introduction unit 21 into which the powder sample S is inserted, a circulation flow path 22 through which sample liquid obtained by dispersing the powder sample S inserted from the sample introduction unit 21 in a solvent is circulated, and a particle size distribution measurement unit 23 that measures a particle size distribution of the powder sample S contained in the sample liquid circulating through the circulation flow path 22.

The sample introduction unit 21 is provided on the circulation flow path 22, and has a sample introduction port 21*a* open to the upper part. In addition, the sample introduction unit 21 is provided with a storage portion 21*b* in which water serving as a solvent for the powder sample S is stored. The sample introduction port 21*a* is formed above the storage portion 21*b*. That is, when the powder sample S is inserted from the sample introduction port 21*a*, the powder sample S is dispersed in the water stored in the storage portion 21*b*.

The circulation flow path 22 is provided with a circulation pump 22*a*. The sample liquid is circulated through the circulation flow path 22 via the storage portion 21*b* of the sample introduction unit 21 by the circulation pump 22*a*.

The particle size distribution measurement unit 23 includes a flow-type measurement cell 23*a* provided in the circulation flow path 22, a laser light source 23*b* that irradiates the measurement cell 23*a* with laser light, a transmitted light detector 23*c* that detects transmitted light having transmitted through the measurement cell 23*a*, a scattered light detector 23*d* that detects scattered light scattered in the measurement cell 23*a*, and a signal processor 23*e* that measures a particle size distribution of the powder sample S on the basis of light intensity signals obtained by the light detectors 23*c* and 23*d*. Note that the signal processor 23*e* also controls the overall operation of the particle size distribution measurement device 2.

Sample Inserting Device 3

As illustrated in FIG. 1, the sample inserting device 3 collects the powder sample S from a sample container 10 storing the powder sample S, and automatically inserts the collected powder sample S into the sample introduction unit 21 of the particle size distribution measurement device 2. The sample container 10 of the present embodiment is a cup-shaped container in which a predetermined amount of the powder sample S is stored.

Figure 3:
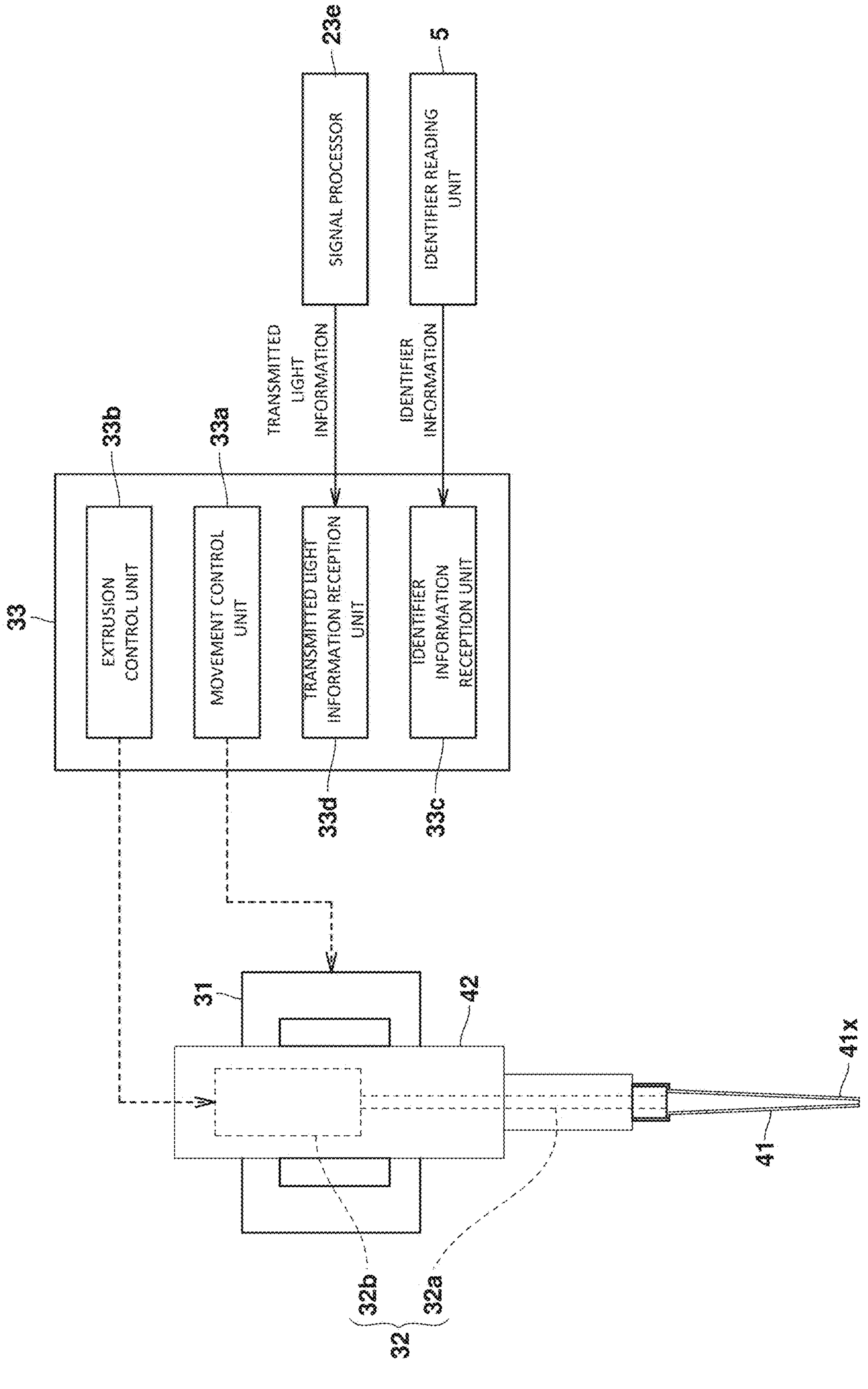
FIG. 3 is a diagram schematically illustrating a configuration of a sample inserting device according to the embodiment.

Specifically, as illustrated in FIGS. 1 and 3, the sample inserting device 3 includes a movement mechanism 31 that moves a holding tube 41 that holds the powder sample S therein, an extrusion mechanism 32 that extrudes the powder sample S from the holding tube 41 that holds the powder sample S, and a control unit 33 that controls the movement mechanism 31 and the extrusion mechanism 32.

The holding tube 41 can collect the powder sample S by holding the powder sample S in a tip opening portion 41*x*. Specifically, the holding tube 41 has the tip opening portion 41*x* whose diameter decreases toward the distal end, and is, for example, a disposable pipette tip in the present embodiment. The holding tube 41 is detachably attached to a holding body 42.

The movement mechanism 31 moves the holding tube 41 by moving the holding body 42 to which the holding tube 41 is attached. Specifically, the movement mechanism 31 includes, for example, a manipulator robot having three or more axes. Then, the movement mechanism 31 moves the holding tube 41 between a collection position P at which the tip opening portion 41*x* is inserted into the powder sample S in the sample container 10 to collect the powder sample S and an insertion position Q at which the powder sample S is inserted into the sample introduction unit 21. The movement mechanism 31 is controlled by a movement control unit 33*a* of the control unit 33 to perform the above operation.

Figure 4:
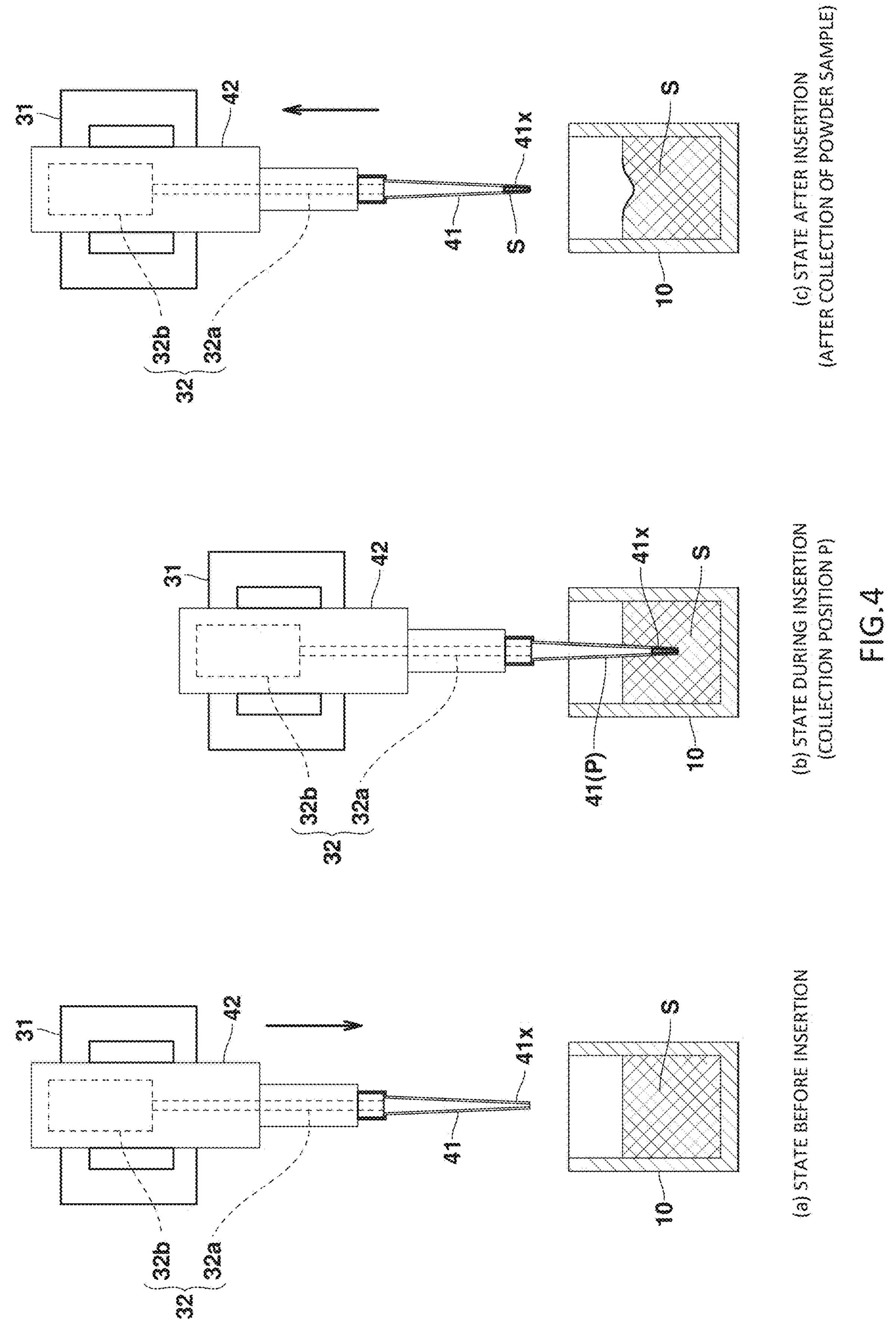
FIG. 4 shows (a) a schematic diagram illustrating a state before a holding tube according to the embodiment is inserted, (b) a schematic diagram illustrating a state in which the holding tube is inserted, and (c) a schematic diagram illustrating a state after the holding tube is inserted.

Here, as illustrated in FIG. 4(*b*), the collection position P may be a position where a predetermined amount of the tip opening portion 41*x* is inserted into the powder sample S in the sample container 10. However, the posture of the holding tube 41 reaching the collection position P (the posture when the tip opening portion 41*x* is inserted into the powder sample S) is set such that the opening direction and the insertion direction of the tip opening portion 41*x* are the same (FIG. 4(*a*)→(*b*)). As a result, when the tip opening portion 41*x* is inserted, the powder sample S easily enters the tip opening portion 41*x*. In the present embodiment, the posture of the holding tube 41 reaching the collection position P is a posture in which the opening direction of the tip opening portion 41*x* faces downward, and the holding tube 41 is moved vertically downward toward the powder sample, and the tip opening portion 41*x* is inserted into the powder sample.

In addition, the insertion position Q may be any position as long as the powder sample S can be inserted into the storage portion 21*b* of the sample introduction unit 21. For example, the insertion position Q may be a position where the tip opening portion 41*x* is above the sample introduction port 21*a* of the sample introduction unit 21, or a position where the tip opening portion 41$x$ is inserted into the inside the sample introduction unit 21 from the sample introduction port 21$a$. However, the insertion position Q is a position where the tip opening portion 41$x$ of the holding tube 41 is not in contact with the solvent in the storage portion 21$b$ (see FIG. 2).

In addition, the movement mechanism 31 has a function of removing the holding tube 41 attached to the holding body 42 and attaching a new holding tube 41. Specifically, the movement mechanism 31 removes the holding tube 41 attached to the holding body 42 at a disposal portion (not illustrated) for disposing of a used holding tube 41, and attaches an unused holding tube 41 to the holding body 42 at a holding tube installation portion 34 (see FIG. 1) for installing the unused holding tube 41. Note that the operation of attaching and detaching the holding tube 41 by the movement mechanism 31 is controlled by the movement control unit 33$a$ of the control unit 33 and is performed for each sample container 10. In addition, the configuration in which the movement mechanism 31 attaches and detaches the holding tube 41 can be appropriately selected according to an attachment and detachment mechanism of the holding tube 41 to and from the holding body 42.

For example, in a case where the attachment and detachment mechanism of the holding tube 41 to and from the holding body 42 is a button type or a lever type, the movement mechanism 31 has an operation portion for operating a button or a lever, and the holding tube 41 can be attached and detached. In addition, in a case where the attachment and detachment mechanism of the holding tube 41 to and from the holding body 42 has a fitting structure using elastic deformation, the movement mechanism 31 can attach and detach by applying physical contact the used holding tube 41 to remove the used holding tube and fitting the unused holding tube 41 into the holding body 42.

In the present embodiment, a plurality of types of holding tubes 41 corresponding to the types of the powder samples S can be installed in the holding tube installation portion 34. Then, the movement mechanism 31 can select the holding tube 41 corresponding to the type of the powder sample S in the sample container 10 from the holding tube installation portion 34 and attach the holding tube to the holding body 42.

Here, each sample container 10 is provided with an identifier (not illustrated) for identifying the type of the stored powder sample S. Examples of the identifier include an IC chip, a barcode, a QR code, and the like. Then, an identifier of each sample container 10 is read by an identifier reading unit 5 (see FIG. 1) provided in the particle size distribution measurement device 2, the sample inserting device 3, or the like, and the type of the powder sample S stored in each sample container 10 is identified. Specifically, the read identifier information is transmitted to an identifier information reception unit 33$c$ of the control unit 33, and the movement control unit 33$a$ of the control unit 33 controls the movement mechanism 31 on the basis of the identifier information. As a result, the movement mechanism 31 can select the holding tube 41 corresponding to the type of the powder sample S in the sample container 10 from the holding tube installation portion 34 and attach the holding tube to the holding body 42. Note that the holding tube 41 corresponding to the type of the powder sample S is the holding tube 41 or the like having an opening diameter, an opening shape, or a tip shape corresponding to the type of the powder sample S.

The extrusion mechanism 32 extrudes the powder sample S held in the tip opening portion 41$x$ to the outside from the tip opening portion 41$x$ in a state where the holding tube 41 is at the insertion position Q. Specifically, the extrusion mechanism 32 supplies gas to the holding tube 41 to discharge the gas from the tip opening portion 41$x$, thereby extruding the powder sample S held in the tip opening portion 41$x$ to the outside from the tip opening portion 41$x$. The extrusion mechanism 32 is controlled by an extrusion control unit 33$b$ of the control unit 33 to perform the above operation.

As illustrated in FIG. 3, the extrusion mechanism 32 includes, for example, a gas supply path 32$a$ formed inside the holding body 42 and a gas supply source 32$b$ for supplying gas to the gas supply path 32$a$. Then, in a state where the holding tube 41 is attached to the holding body 42, the gas supply path 32$a$ communicates with the proximal end opening portion of the holding tube 41 and can supply the gas into the holding tube 41. The gas supplied to the proximal end opening portion of the holding tube 41 flows inside the holding tube 41 and is discharged to the outside from the tip opening portion 41$x$. As a result, the powder sample S held in the tip opening portion 41$x$ is discharged to the outside from the tip opening portion 41$x$. Note that the gas supply source 32$b$ is, for example, a compressed air source that supplies compressed air to the gas supply path 32$a$. In addition to the configuration in which the gas supply source 32$b$ is provided inside the holding body 42, the configuration in which the gas supply source is provided outside the holding body 42 may be adopted.

In addition, as illustrated in FIG. 1, the sample inserting device 3 includes a container installation portion 35 in which the sample container 10 is installed, and the container installation portion 35 is provided with a detection sensor (not illustrated) that detects that the sample container 10 is installed. The container installation portion 35 is provided within a movable range of the movement mechanism 31 on a common base 30 together with the holding tube installation portion 34 described above. In the present embodiment, the movement mechanism 31 is provided on the base 30.

In addition, as illustrated in FIG. 1, the particle size distribution measurement system 100 of the present embodiment further includes a housing 6 that accommodates at least a part of the particle size distribution measurement device 2 including the sample inserting device 3 and the sample introduction unit 21. The housing 6 includes a manual measurement door 61 that is opened and closed to manually introduce the powder sample S into the sample introduction unit 21, and a sample setting door 62 for installing the sample container 10 in the container installation portion 35 of the sample inserting device 3. Note that the manual measurement door 61 and the sample setting door 62 may be common.

Operation of Particle Size Distribution Measurement System 100

Next, an operation of the particle size distribution measurement system 100 will be described with reference to FIG. 5 and the like.

First, a user opens the sample setting door 62 of the housing 6 and install the sample container 10 to be measured in the container installation portion 35. After the sample container 10 is installed, the sample setting door 62 is closed (see FIG. 5($a$)).

Figure 5:
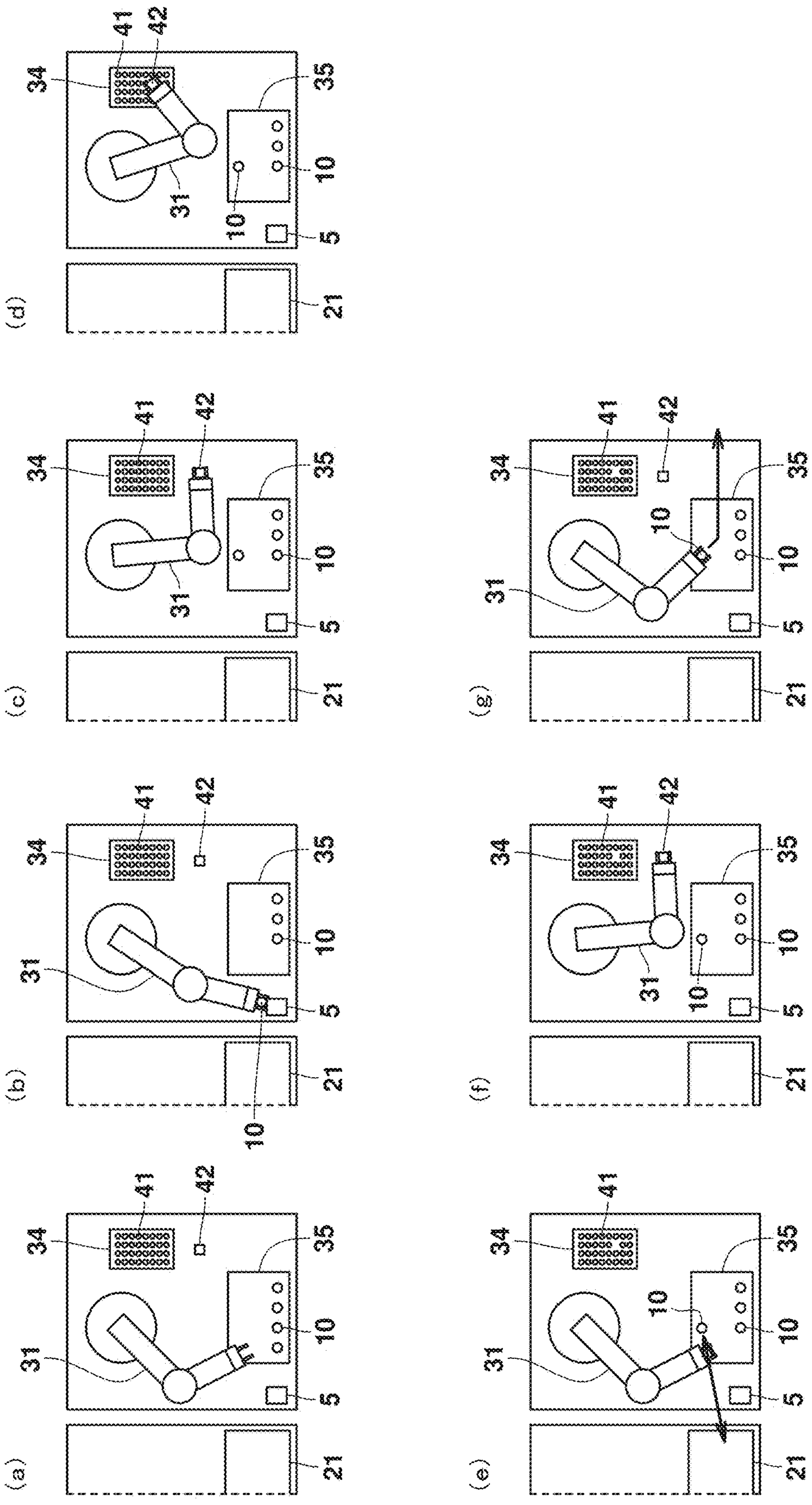
FIG. 5 is a schematic diagram illustrating a measurement procedure of the particle size distribution measurement system according to the embodiment.

Then, when the automatic insertion of the powder sample S by the sample inserting device 3 is started, as illustrated in FIG. 5($b$), the movement mechanism 31 of the sample inserting device 3 grips the sample container 10, moves the sample container 10 to the identifier reading unit 5, and reads the identifier provided in the sample container 10 (identifier reading step). As a result, the type of the powder sample S stored in the sample container 10 is identified, and the identifier information is transmitted to the signal processor 23*e* of the particle size distribution measurement device 2 and the identifier information reception unit 33*c* of the control unit 33. The signal processor 23*e* of the particle size distribution measurement device 2 that has acquired the identifier information performs setting according to the type of the powder sample S. This setting includes a refractive index of the sample, an arithmetic condition, a measurement sequence, a method of storing a measurement result, and the like.

Thereafter, as illustrated in FIG. 5(*c*), the movement mechanism 31 places the sample container 10 at a predetermined position of the container installation portion 35 and grips the holding body 42. Then, as illustrated in FIG. 5(*d*), the movement mechanism 31 moves the holding body 42 to the holding tube installation portion 34, selects the holding tube 41 corresponding to the type of the powder sample S on the basis of the identifier information received by the identifier information reception unit 33*c*, and attaches the holding tube to the holding body 42 (holding tube attaching step). At this time, the particle size distribution measurement device 2 injects a solvent into the circulation flow path 22 and performs blank measurement.

Next, as illustrated in FIG. 5(*e*), the movement mechanism 31 moves the holding tube 41 to the collection position P, and inserts the tip opening portion 41*x* of the holding tube 41 into the powder sample S in the sample container 10 (see FIG. 4(*b*)). As a result, the powder sample S enters the tip opening portion 41*x* and is held in the tip opening portion 41*x* (collection step). Then, the movement mechanism 31 moves the holding tube 41 holding the powder sample S to the insertion position Q. When the holding tube 41 is moved to the insertion position Q, the extrusion mechanism 32 supplies gas to the holding tube 41 to extrude the powder sample S to the outside from the tip opening portion 41*x*. As a result, the powder sample S is inserted into the sample introduction unit 21 (insertion step). The movement path of the holding tube 41 between the collection position P and the insertion position Q by the movement mechanism 31 is set such that the holding tube 41 does not pass above a portion or a member that does not like dirt, such as the sample container 10 and the holding tube installation portion 34 which are not to be collected. As a result, the portion or the member that does not like dirt, such as the sample container 10 and the holding tube installation portion 34 which are not to be collected, are prevented from being contaminated by the powder sample S falling from the holding tube 41.

Here, as illustrated in FIG. 3, the control unit 33 of the sample inserting device 3 includes a transmitted light information reception unit 33*d* that receives transmitted light information related to transmitted light of the sample liquid containing the powder sample S inserted into the sample introduction unit 21 from the signal processor 23*e* of the particle size distribution measurement device 2. Note that the transmitted light information is, for example, transmittance, transmitted light intensity, or the like. Then, the control unit 33 of the sample inserting device 3 controls the movement mechanism 31 and the extrusion mechanism 32 to repeat the collection operation (collection step) of the powder sample S and the insertion operation (insertion step) into the sample introduction unit 21 until the transmitted light information received by the transmitted light information reception unit 33*d* satisfies a predetermined condition. Note that the predetermined condition is transmittance, transmitted light intensity, or the like obtained when a predetermined amount of the powder sample S, for example, 10 mg in total, is inserted.

When the transmitted light information satisfies the predetermined condition, the sample inserting device 3 stops the collection operation (collection step) and the insertion operation (insertion step) of the powder sample S. In addition, the particle size distribution measurement device 2 starts the particle size distribution measurement of the introduced powder sample S. The particle size distribution measurement result can be transmitted from the signal processor 23*e* to a user terminal.

On the other hand, the movement mechanism 31 of the sample inserting device 3 discards the used holding tube 41 from the holding body 42 to a disposal portion (not illustrated) and returns the holding body 42 to a predetermined installation place (see FIG. 5(*f*)). The movement path of the holding tube 41 from the insertion position Q to the disposal portion by the movement mechanism 31 is set such that the holding tube 41 does not pass above a portion or a member that does not like dirt, such as the sample container 10 and the holding tube installation portion 34 which are not to be collected. As a result, the portion or the member that does not like dirt, such as the sample container 10 and the holding tube installation portion 34 which are not to be collected, are prevented from being contaminated by the powder sample S falling from the holding tube 41. Thereafter, the movement mechanism 31 grips the sample container 10 that has been used for measurement and moves the sample container to a used box (not illustrated) (see FIG. 5(*g*)).

As described above, a series of operations from insertion of the powder sample S collected from one sample container 10 to the particle size distribution measurement is completed. In a case where a plurality of the sample containers 10 is continuously measured, the above series of operations is continuously performed for each sample container 10. Note that when the plurality of sample containers 10 is continuously measured, the holding tube 41 is replaced for each measurement of the sample container 10.

Effects of Present Embodiment

According to the particle size distribution measurement system 100 of the present embodiment configured as described above, since the holding tube 41 capable of holding the powder sample S in the tip opening portion 41*x* is moved between the collection position P and the insertion position Q by the movement mechanism 31, the powder sample S can be automatically inserted from the sample container 10 to the sample introduction unit 21. Here, at the collection position P, the tip opening portion 41*x* of the holding tube 41 is inserted into the powder sample S in the sample container 10, and the powder sample S enters the tip opening portion 41*x*, whereby the powder sample S is held in the tip opening portion 41*x*. That is, even in a case it is necessary to collect a small amount (for example, 1 to 10 mg) of powder sample, it is possible to reliably collect the powder sample S only by inserting the tip opening portion 41*x* of the holding tube 41 into the powder sample S. In addition, since the powder sample S held in the tip opening portion 41*x* of the holding tube 41 is extruded to the outside from the tip opening portion 41*x* by the extrusion mechanism 32 at the insertion position Q, the powder sample S held in the tip opening portion 41$x$ of the holding tube 41 can be reliably inserted into the sample introduction unit 21.

OTHER EMBODIMENTS

Figure 6:
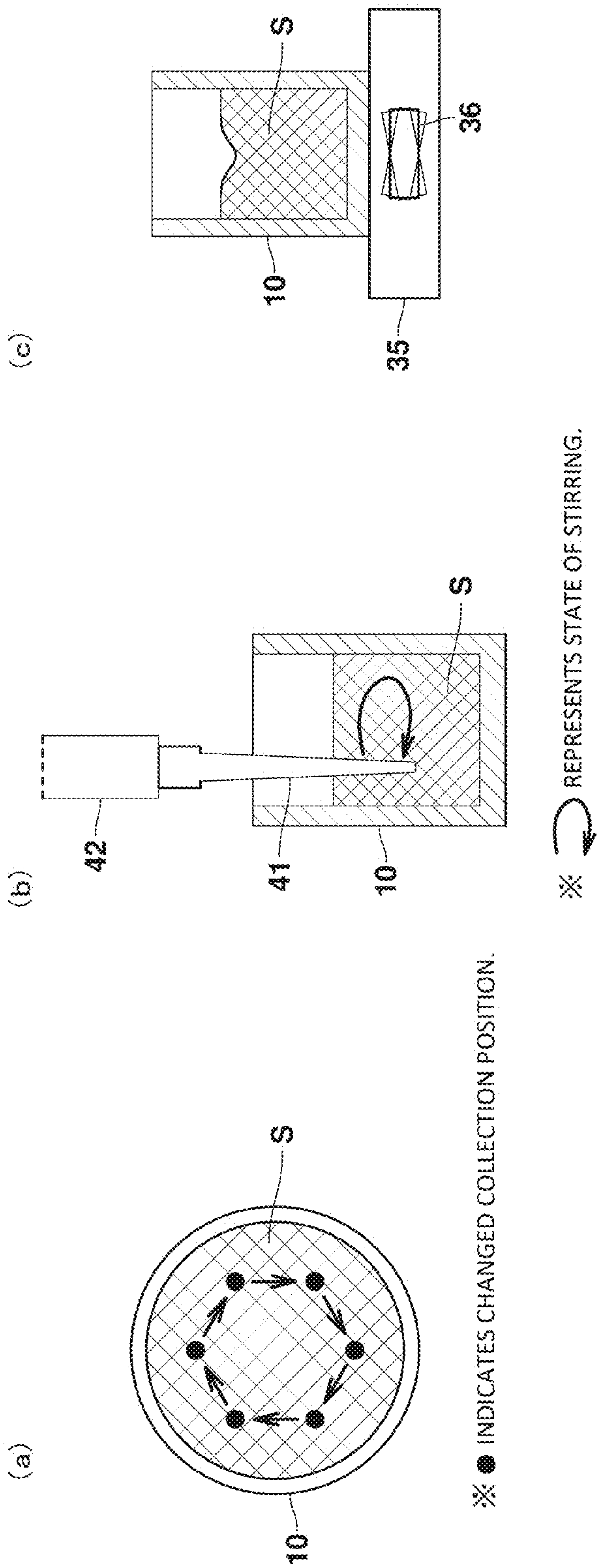
FIG. 6 is a schematic diagram illustrating an operation of a sample inserting device according to a modification.

For example, as illustrated in FIG. 6($a$), the movement mechanism 31 may change the collection position P in the sample container 10. That is, when the powder sample S is collected from one sample container 10 a plurality of times, the collection position P may be changed every time the powder sample S is collected or every predetermined number of times of collection.

In addition, as illustrated in FIG. 6($b$), the movement mechanism 31 may stir the powder sample S in the sample container 10 using the holding tube 41. That is, when the powder sample is collected from one sample container 10 a plurality of times, the powder sample S may be stirred every time the powder sample is collected or every predetermined number of times of collection.

Furthermore, as illustrated in FIG. 6($c$), the sample inserting device 3 may further include a vibration unit 36 that vibrates the sample container. It is conceivable that the vibration unit 36 is configured to vibrate the container installation portion 35 in which the sample container 10 is installed. In addition, the movement mechanism 31 that grips the sample container 10 may be configured to vibrate the sample container 10.

Figure 7:
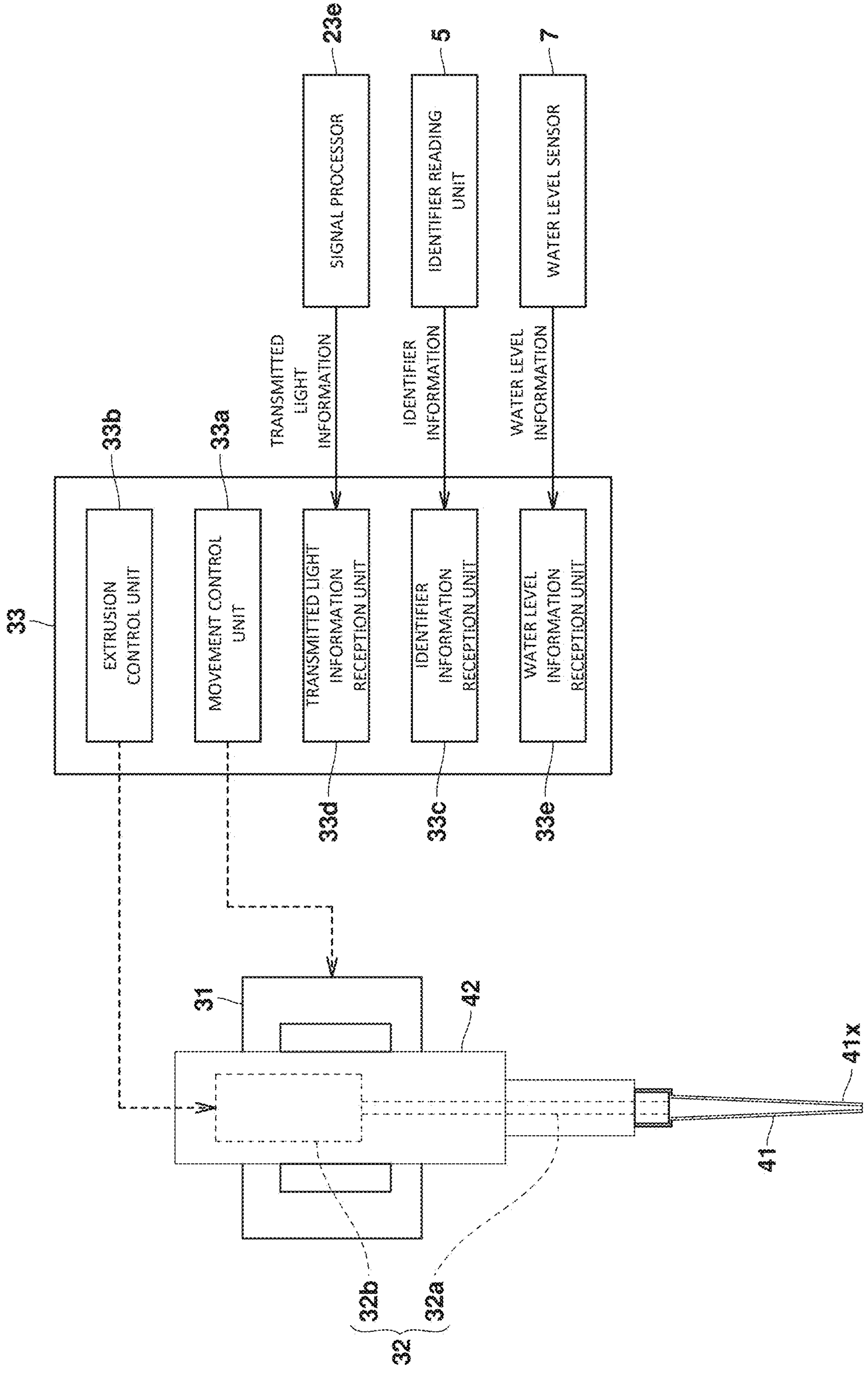
FIG. 7 is a diagram schematically illustrating a configuration of the sample inserting device according to the modification.

In addition, as illustrated in FIG. 7, the control unit 33 of the sample inserting device 3 further includes a water level information reception unit 33$e$ that receives water level information of water serving as the solvent for the powder sample S in the sample introduction unit 21, and the movement mechanism 31 may be configured to adjust the insertion position Q on the basis of the water level information. Note that the water level information can be detected by a water level sensor 7 provided in the sample introduction unit 21. In a case where the water level information is predetermined according to the type of the powder sample S, the water level information can be acquired by reading the identifier.

The extrusion mechanism 32 of the above embodiment is configured to extrude the powder sample S with gas such as air, but may be configured to extrude the powder sample S with water serving as a solvent, or may be configured to extrude the powder sample S with an extrusion member provided movably inside the holding tube 41.

Figure 8:
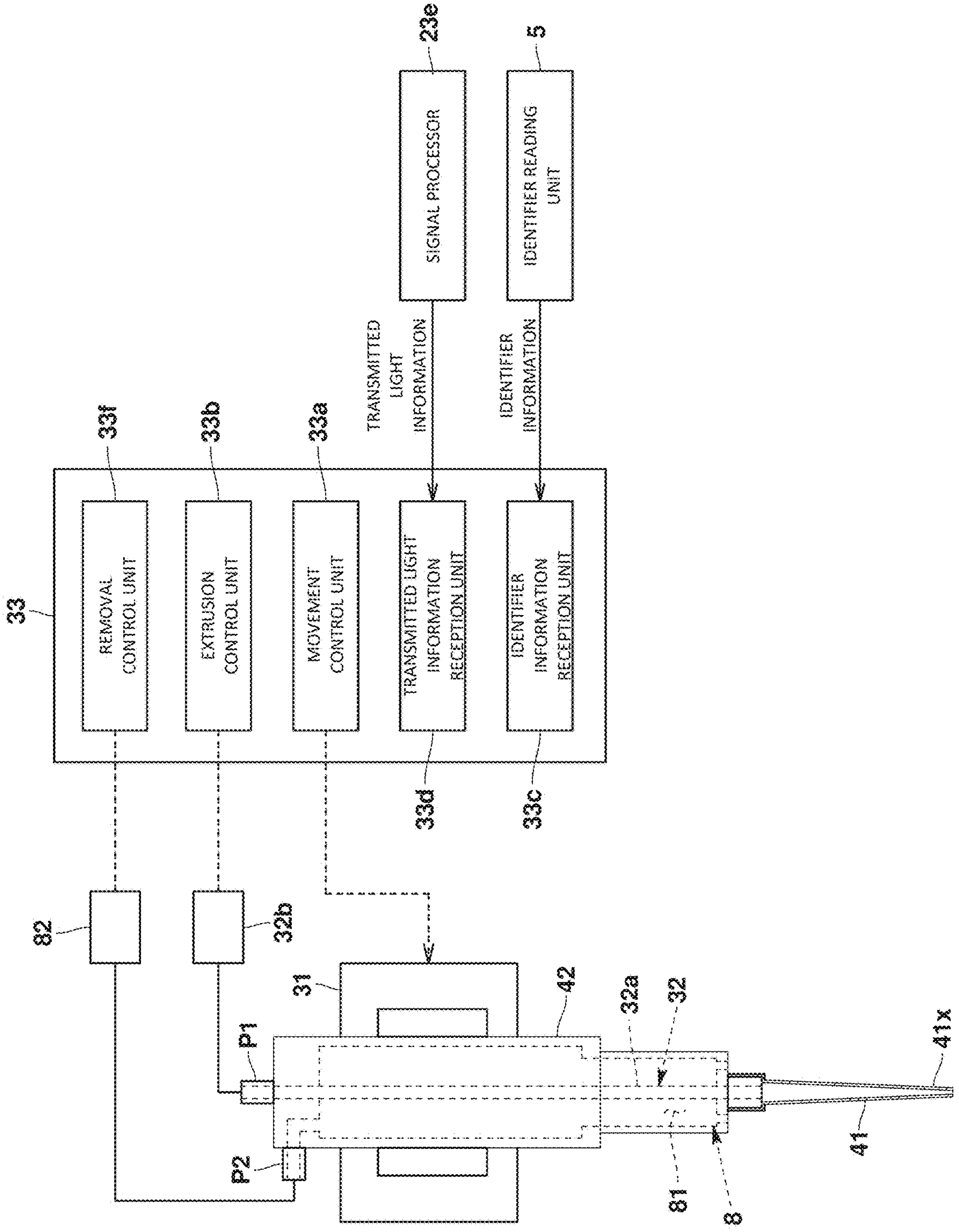
FIG. 8 is a diagram schematically illustrating a configuration of the sample inserting device according to the modification.

Furthermore, as illustrated in FIG. 8, the sample inserting device 3 may include a removal mechanism 8 that removes the powder sample S attached to the outer peripheral surface of the holding tube 41. The removal mechanism 8 blows gas onto the outer peripheral surface of the holding tube 41 attached to the holding body 42 to remove the powder sample S adhering to the outer peripheral surface. Note that the removal mechanism 8 is controlled by a removal control unit 33$f$ of the control unit 33 to perform the above operation.

Specifically, the removal mechanism 8 includes a gas supply path 81 formed inside the holding body 42 and a gas supply source 82 that supplies gas to the gas supply path 81. The gas supply path 81 opens to the outside of the attached holding tube 41 in the holding body 42. FIG. 8 illustrates an example in which both the gas supply source 32$b$ of the extrusion mechanism 32 and the gas supply source 82 of the removal mechanism 8 are provided outside the holding body 42. Therefore, the holding body 42 is provided with a connection port P1 connected to the gas supply source 32$b$ of the extrusion mechanism 32 and a connection port P2 connected to the gas supply source 82 of the removal mechanism 8. In addition, the gas supply path 32$a$ of the extrusion mechanism 32 and the gas supply path 81 of the removal mechanism 8 are separate flow paths, and the extrusion operation by the extrusion mechanism 32 and the removal operation by the removal mechanism 8 can be individually performed. Note that the gas supply source 32$b$ and the gas supply source 82 may be common.

Then, the removal operation by the removal mechanism 8 is performed after the collection step of the above embodiment in a state where the tip opening portion 41$x$ of the holding tube 41 is pulled up from the powder sample S in the sample container 10 (removal step). Thereafter, the insertion step is performed in the same manner as in the above embodiment. With this configuration, it is possible to prevent the powder sample S adhering to the outer peripheral surface of the holding tube 41 from falling while the holding tube 41 moves from the collection position P to the insertion position Q. As a result, the portion or the member that does not like dirt, such as the sample container 10 and the holding tube installation portion 34, which are not to be collected, are prevented from being contaminated by the powder sample S falling from the holding tube 41.

In the above embodiment, the identifier of the sample container 10 is read by the identifier reading unit to acquire information such as the type of the powder sample, but the user may input the sample information to the particle size distribution measurement device 2 or the sample inserting device 3 without providing the identifier in the sample container 10.

In the above embodiment, the movement mechanism 31 grips and moves the holding body 42, but the holding body 42 may be detachably provided in the movement mechanism 31.

The sample inserting device 3 of the present invention can be used in combination with various particle size distribution measurement devices 2. Specifically, by disposing the sample introduction unit 21 of the particle size distribution measurement device 2 within the movable range of the movement mechanism 31 of the sample inserting device 3, the sample inserting device 3 can be used in combination with various particle size distribution measurement devices 2.

In addition, various modifications and combinations of the embodiments may be made without departing from the gist of the present invention.

INDUSTRIAL APPLICABILITY

According to the present invention, it is possible to reliably insert the powder sample into the sample introduction unit of the particle size distribution measurement device while automating the insertion of the powder sample.

REFERENCE SIGNS LIST

100 particle size distribution measurement system
10 sample container
S powder sample
2 particle size distribution measurement device
21 sample introduction unit
3 sample inserting device
P collection position
Q insertion position
31 movement mechanism
32 extrusion mechanism
33 control unit 33*a* movement control unit
33*b* extrusion control unit
33*c* identifier information reception unit
33*d* transmitted light information reception unit
33*e* water level information reception unit
34 holding tube installation portion
35 container installation portion
41*x* tip opening portion
41 holding tube
42 holding body
5 identifier reading unit
6 housing

The invention claimed is:

1. A sample inserting device configured to collect a powder sample from a sample container storing the powder sample and insert the collected powder sample into a sample introduction unit of a particle size distribution measurement device, the sample inserting device comprising:

a movement mechanism configured to move a holding tube capable of holding the powder sample in a tip opening portion between a collection position at which the tip opening portion is inserted into the powder sample in the sample container to collect the powder sample and an insertion position at which the powder sample is inserted into the sample introduction unit; and an extrusion mechanism configured to extrude the powder sample held in the tip opening portion to outside from the tip opening portion in a state where the holding tube is at the insertion position.

2. The sample inserting device according to claim 1, further comprising a transmitted light information reception unit configured to receive, from the particle size distribution measurement device, transmitted light information related to transmitted light of sample liquid containing the powder sample inserted into the sample introduction unit, wherein the sample inserting device repeats a collection operation and an insertion operation of the powder sample until the transmitted light information received by the transmitted light information reception unit satisfies a predetermined condition.

3. The sample inserting device according to claim 1, wherein the extrusion mechanism extrudes the powder sample held in the tip opening portion to outside from the tip opening portion by supplying gas to the holding tube and discharging gas from the tip opening portion.

4. The sample inserting device according to claim 1, wherein the movement mechanism is able to change the collection position in the sample container.

5. The sample inserting device according to claim 1, wherein the movement mechanism stirs the powder sample in the sample container with the holding tube.

6. The sample inserting device according to claim 1, further comprising a vibration unit configured to vibrate the sample container.

7. The sample inserting device according to claim 1, wherein the movement mechanism moves the holding tube between the collection position and the insertion position by moving the holding body to which the holding tube is detachably attached.

8. The sample inserting device according to claim 7, comprising a holding tube installation portion configured to install a plurality of types of holding tubes corresponding to respective types of powder samples, wherein the movement mechanism moves the holding body to the holding tube installation portion to attach the holding tube corresponding to the type of the powder sample to the holding body.

9. The sample inserting device according to claim 1, further comprising a water level information reception unit configured to receive water level information of water serving as a solvent for the powder sample in the sample introduction unit, wherein the movement mechanism adjusts the insertion position on a basis of the water level information.

10. A sample inserting system comprising:

a sample inserting device according to claim 1; and a housing configured to accommodate at least a part of the particle size distribution measurement device including the sample inserting device and the sample introduction unit.

11. A particle size distribution measurement system comprising:

a particle size distribution measurement device; and a sample inserting device according to claim 1.

12. A sample inserting method of collecting a powder sample from a sample container storing the powder sample and inserting the collected powder sample into a sample introduction unit of a particle size distribution measurement device, the sample inserting method comprising:

a collection step of inserting the tip opening portion into the powder sample in the sample container to collect the powder sample using a holding tube capable of holding the powder sample in the tip opening portion; and an insertion step of moving the holding tube holding the powder sample to the sample introduction unit and inserting the powder sample held by the holding tube into the sample introduction unit.

13. The sample inserting method according to claim 12, comprising:

acquiring transmitted light information related to transmitted light of sample liquid containing the powder sample inserted into the sample introduction unit from the particle size distribution measurement device; and repeating the collection step and the insertion step until the transmitted light information satisfies a predetermined condition.

* * * * *